B. A. NEUMANN.
CASH REGISTER.
APPLICATION FILED FEB. 23, 1916.
1,247,709.
Patented Nov. 27, 1917.
4 SHEETS—SHEET 1.
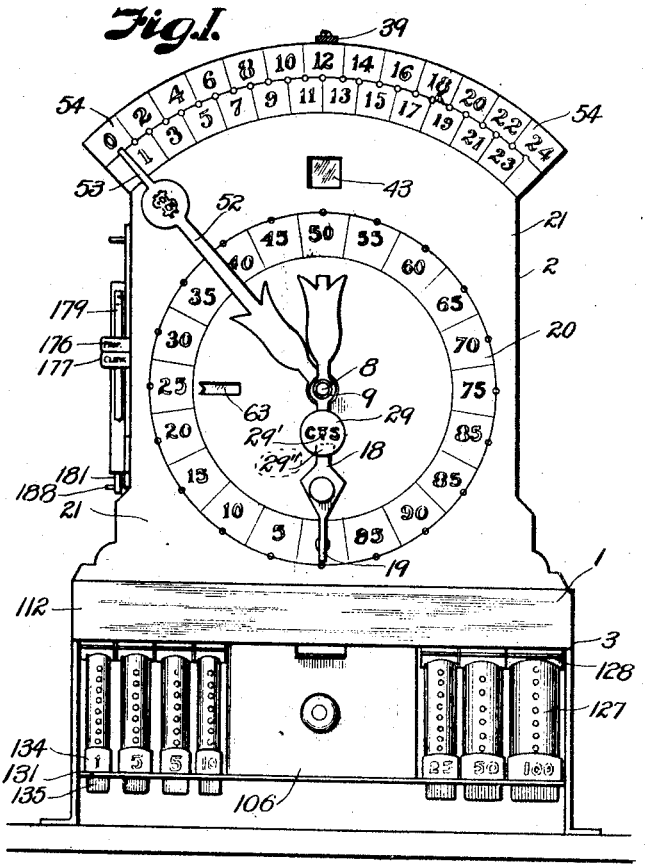
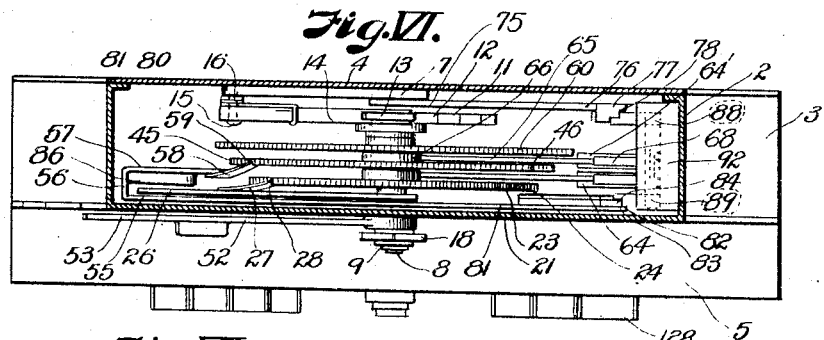
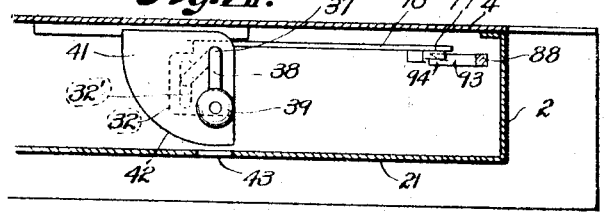
INVENTOR
*Bernhard A. Neumann*
BY
*Arthur C. Brown*
ATTORNEY

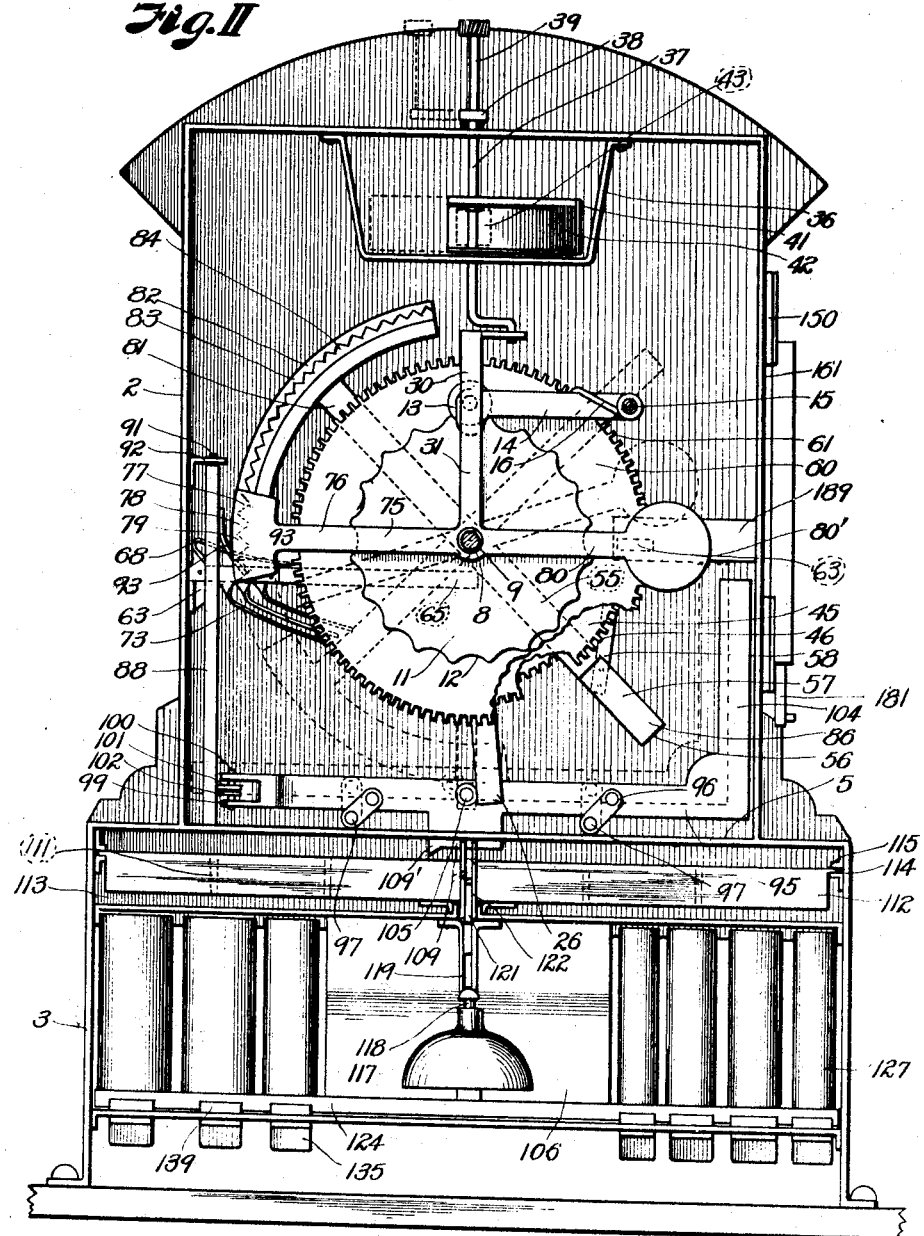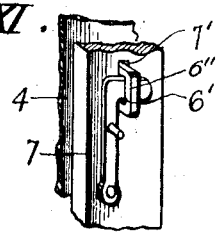

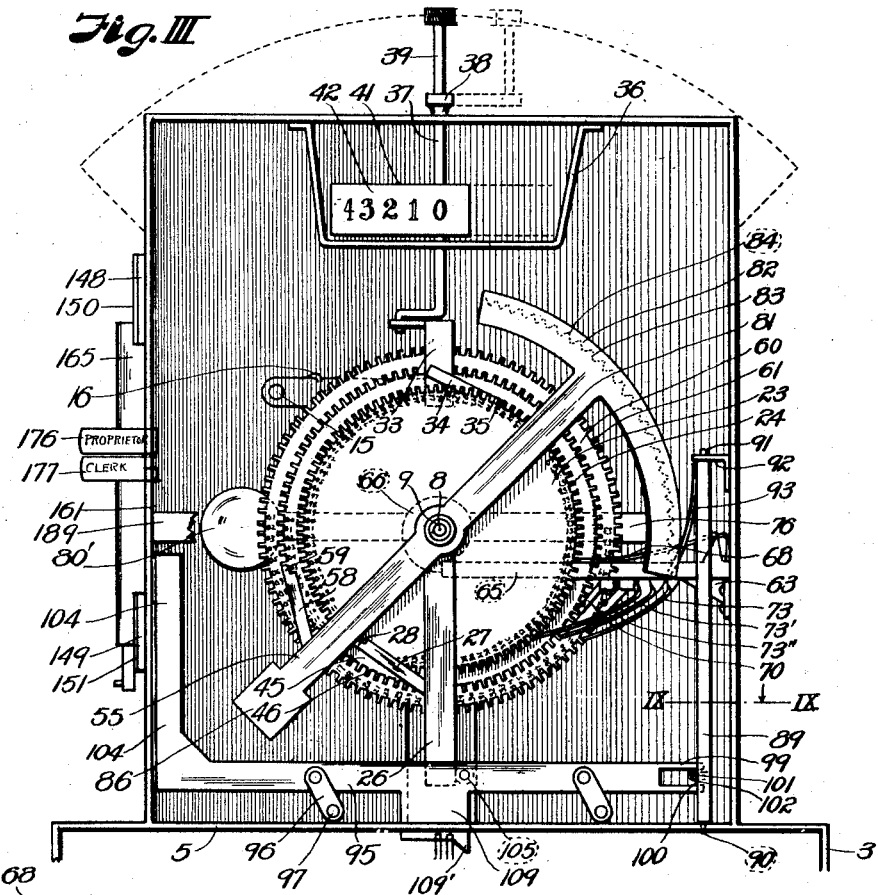
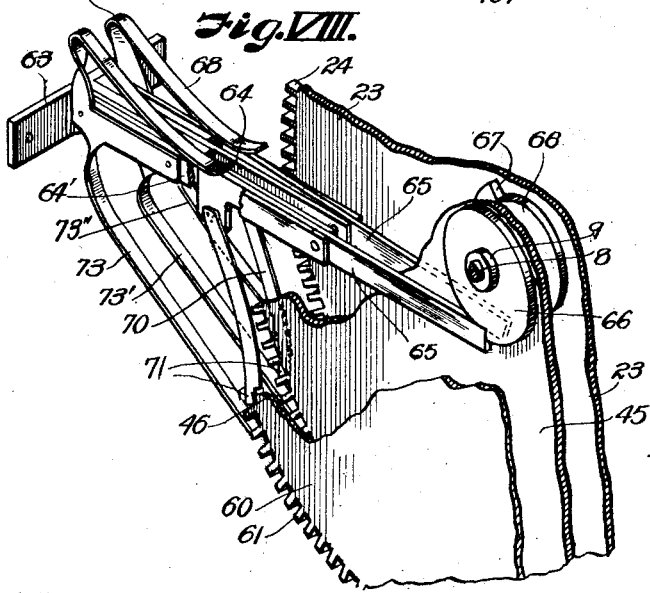
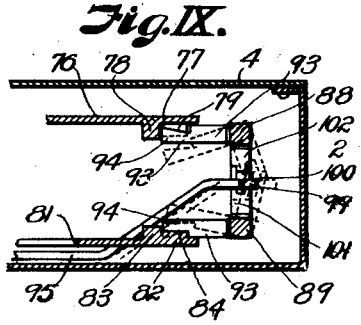

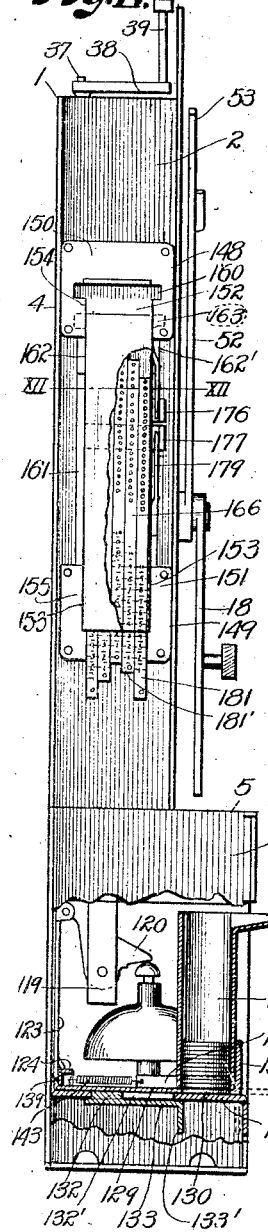

UNITED STATES PATENT OFFICE.

BERNHARD A. NEUMANN, OF KANSAS CITY, KANSAS.

CASH-REGISTER.

1,247,709. Specification of Letters Patent. Patented Nov. 27, 1917.

Application filed February 23, 1916. Serial No. 79,888.

*To all whom it may concern:*

Be it known that I, BERNHARD A. NEUMANN, a citizen of the United States, residing at Kansas City, in the county of Wyandotte and State of Kansas, have invented certain new and useful Improvements in Cash-Registers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cash registers and more particularly to a device of that character, whereby amounts of sales are indicated by the person making a sale and to the purchaser, and whereby the amounts of sales are accumulated upon successive operations of the register, the principal object of the invention being to simplify the indicating and registering mechanism to provide a simple and inexpensive device.

In accomplishing this object I have provided improved details of structure, the preferred forms of which are illustrated in the accompanying drawings, wherein:

Figure I is a front view of a cash register, constructed according to my invention.

Fig. II is a rear view of the same, the back plate of the register housing being removed to illustrate the contained parts.

Fig. III is a front view of the register mechanism the front housing plate being removed.

Fig. IV is a side view of the register, particularly illustrating the lock, a part of the tray housing being removed and part shown in section.

Fig. V is a central vertical section of the register.

Fig. VI is a horizontal section on the line VI—VI Fig. V.

Fig. VII is a plan view of a part of the register, the upper housing being in horizontal section on the line VII—VII, Fig. V particularly illustrating the operation of the cents dial.

Fig. VIII is an enlarged detail perspective of the cent and dollar register disks, with their operating and carry-over mechanism.

Fig. IX is an enlarged horizontal section on the line IX—IX Fig. III, particularly illustrating the disk lever release mechanism.

Fig. X is a detail perspective view of a part of the change making element.

Fig. XI is a detail perspective view of a back plate latch.

Referring more in detail to the drawings:

1 designates the casing for the register, which comprises an upper section 2 that houses the indicating and accumulating mechanism, and a lower section 3 that houses the cash drawer and change tubes, hereinafter more specifically described, the upper section being superimposed on the lower and having a back part 4 common to both and a shelf 5 that forms the bottom of the upper section and top of the lower section and an extension from the bottom of the top section, the lower section being of greater depth than the upper, in order to accommodate the cash drawer and change tubes.

Fixed to the shelf 5 and rising therefrom at the transverse center of the upper section is a standard 7 upon which operative parts of the machine are mounted and to which the back member 4 is removably attached by a latch (Fig. XI) that is mounted on said standard and takes into the notch 6' in an ear 6'' that is fixed to the back 4 and extends through a slot 7' in the standard. The latch moves automatically to functional position but may be shifted to release position by a key that may be projected through the back opening presently described. Fixed to the standard about the vertical center of the upper section 2 is an arbor 8 that extends through the front of the casing, and rotatably mounted on said arbor is a sleeve 9. Fixed to sleeve 9 at the rear of the casing is a disk 11 (Fig. II) having twenty peripheral sockets 12 therein, spaced equally about the circumference of the disk, and adapted to seat a roller 13, that is carried on an arm 14 which is pivotally mounted on a stub-shaft 15 that is supplemented on the standard 7, and surrounding said shaft and bearing against the arm 14 is a spring 16, yieldingly urging the arm to force the roller to seat in the disk sockets and hold the disk in definite set position.

Also fixed on the sleeve 9 and exposed at the front of the casing, is an indicator arm 18 having a pointer 19 adapted for travel over a scale 20 on the front cover 21 of the casing, and divided into twenty spaces, that are numbered by fives consecutively from naught to ninety-five. Rotatably mounted on the sleeve 9, at the front of the casing, is a wheel 23, having one hundred peripheral teeth 24 spaced equally about its circumference and numbered consecutively from 00 to 99, with the numbering running contra clockwise around the periphery of the wheel. Fixed to the sleeve 9, within the casing, is an arm 26, and fixed to said arm is a spring finger 27, having an end lip 28 directed toward the wheel 23 and adapted for engaging the teeth 24 thereon, so that when the arm is moved clockwise the lip 28 will engage a tooth in the cents wheel and move the same proportionately to the movement of the indicator arm 18, it being apparent that the spring lip will yield when the arm may assume a new position relative to the wheel.

With the socket disk II, the indicator arm 18 and the forwarding arm 26, all fixed on the sleeve, it is apparent that when the indicator arm is moved it will carry the disk and the forwarding arm with it to advance the cents wheel proportionately to the movement of the indicator arm, and that the disk will move under its keeper roller to permit movement of the sleeve, but that when the indicator arm is stopped the roller will assume a position in its disk to hold the latter in the set position. To identify the arm 18 I provide it with a disk 29 bearing the designation "Cts." The disk is pivotally mounted on a stud 29′ (Fig. I) on the arm and provided at the lower edge with a weight 29″ so that the arm will automatically assume readable position.

The indicator arm 18 is adapted for turning the cents wheel for five-point spaces only and in order to register amounts under five cents I provide a separate mechanism, comprising a bracket 30 (Fig. II) having an arm 31 pivotally mounted on the arbor 8 and a head 32 extending over the dollar and hundred dollar wheels, hereinafter mentioned, the front end of the head having a depending arm 33 (Figs. III–V) lying back of the cents wheel 22 and provided with a spring finger 34, having a slip 35 adapted for engaging the teeth of the cents wheel in the same manner as described with reference to the finger 27 on the arm 26.

Rotatably mounted in a bracket 36 that is suspended from the top of the casing is a rod 37, the inner end of which is cranked and slidably mounted in a slot 32′ (dotted lines Fig. VII) in the head 32; the upper end of the rod being provided with a crank 38, having a handle 39 by which the crank may be turned to rotate the rod and move the operating finger over the cents wheel.

Fixed on the rod 37 is an indicator 41, having a curved face 42 upon which the numerals 0, 1, 2, 3, 4, are marked and observable through a window 43 in the front of the casing. With this mechanism, when the handle is turned forwardly, the cents wheel will be revolved proportionately so that an amount less than five-cents may be recorded, the cents wheel turning on the arbor wheel without affecting the nickel indicator arm or anchoring disk.

Rotatably mounted on the sleeve 9, back of the cents wheel, is the dollar wheel 45, having the peripheral teeth 46, numbered consecutively from 00 to 99. Rotatably mounted on the sleeve 9 in an aperture in the front of the casing, is a collar 50 that carries a dollar arm 52 having a pointer 53 that is movable over a scale 54 on the front 21 of the casing, and is divided into twenty-five spaces, each of which may be suitably designated.

Also fixed on the collar 50, but within the casing, is an arm 55 (Fig. VI) having a head 56 extending backwardly over the cents wheel and provided with the end lip 59, the latter being adapted for taking into the teeth in the dollar wheel, so that when the dollar indicating arm is moved on its mounting the dollars wheel is revolved.

With the two wheels previously mentioned, cents and dollars may be registered, and suitable mechanism is provided for carrying over from the cents wheel to the dollar wheel, and from the dollar wheel to a hundred dollar wheel 60, that is rotatably mounted on the sleeve 9 back of the dollars wheel, and provided with the peripheral teeth 61, which are 100 in number and suitably marked on the face of the wheel, the cents, dollars and hundred-dollars wheels being of progressively greater diameter so that one is exposed behind the other in order that the reading thereon may be reviewed through a window 63 at the front of the casing.

The carry-over mechanism whereby a wheel for units of a higher value is advanced a point upon the completion of a revolution of a wheel of lesser value, comprises a bracket 63 which is attached to the side of the casing and comprises spaced arms 64—64′, etc., each of which is bifurcated.

Pivotally mounted between the bifurcated portion of each arm is a lever 65, that lies along one of the wheels and is adapted for engagement by a cam 66 that is fixed to the adjacent wheel.

Referring specifically to the carry-over from the cents to the dollar wheel, 65 designates the lever and 66 the cam for that wheel, the cam being so arranged that its step-off 67 will push the lever to its fullest point as the wheel finishes a complete revolution. The lever 66 rocks on its pivotal mounting against the tension of a leaf spring 68 that is mounted on the bracket and engages the upper edge of the lever at the end opposite its contact with the cam, to resist movement of the lever and return the same after the cam leaves its contact therewith. Fixed to the end of the lever, opposite the cam point, is a spring arm 70, having a lip therein that engages the teeth 46 on the dollars wheel, so that when the arm is raised, because of the cam engagement, it will lie along the teeth and when the arm is returned, under tension of the spring 68, the lip will engage a tooth of the dollar wheel to forward the latter, the travel being limited to a distance that will advance the dollar wheel one point, so that upon each complete revolution of the cents wheel that would indicate the registration of 100 cents, the dollar wheel is advanced one point to accumulate a dollar on the record.

In order to steady the mechanism, I provide the wiping springs 73—73' 73'', etc., which are adapted for constantly engaging the teeth of the several wheels to exert a drag thereon, to prevent their being thrown beyond the point of advancement by the indicator arm, and which are adapted for engaging the teeth to positively prevent retrograde movement.

In order to prevent confusion in the recording of an amount on the register, which might be occasioned by the operator being interrupted before he had completed the operation, and which particularly might consist of the operator advancing one of the wheels part way and then releasing the wheel, or moving the same backwardly slightly, before it had reached its desired limit, I provide means for automatically locking the wheels against retrograde movement at each operation and for automatically returning the wheel operating levers after each operation. This mechanism comprises a cross arm 75 that is integral with the bracket 30 that controls the operation of the cents wheel, one member of which is provided with a head 77 that extends to near the side of the casing and is provided with a segmental flange 78, having circumferential ratchet teeth 79. The opposite member 80 of the cross arm is provided with a weight 80' which is adapted for automatically returning the cross arm and bracket to initial position when unrestrained.

The lever 53 that controls the operation of the dollars bracket is also provided with an arm 81, having the segmental head 82, provided with the flange 83, having the peripheral teeth 84, the head 82 being arranged at the side of the pivotal mounting of the lever opposite the wheel forwarding arm, and the end of the lever carrying the arm is provided with a weight 86 that will overbalance the head 82 to automatically return the arm to its initial position.

Located at the side of the casing, and extending along the lever heads 77 and 82, are spaced standards 88—89 each of which has a pin 90 (Fig. III) at its lower end rotatably mounted in a socket in the shelf 5, and a pin 91 at its upper end pivotally mounted in an aperture in bracket 92 that extends inwardly from the side of the casing. Fixed to each of said posts is a leaf spring 93, (Fig. IX) which extends toward the interior of the casing and has a lip 94 at its end that wipes the peripheral teeth 79 or 84 of a respective lever head 77 or 82, it being apparent that when the levers are moved clockwise to advance their respective wheels, the ratchet teeth will move over the springs and thus the springs will hold the ratchet teeth to prevent retrograde movement of the lever arm. In this way when the levers are moved about to enter an amount on the register, they may move forwardly against the wiping pressure of the springs 93, but are held against backward movement until released, so that should the operator stop before completing the register the lever will be held in the position in which it is stopped and the movement may be afterward completed to the proper point, it being impossible to release the levers until the posts 88 and 89 are moved on their pivotal mounting to throw the springs out of engagement with the lever-heads. This actuation of the posts is effected through a lock bar 95 that controls the cash drawer, the said bar being pivotally mounted on vertical links 96 that are carried on pins 97, which are mounted on the front of the casing.

The bar 95 has a lateral and vertical movement on its link mounting, and one end is provided with spaced fingers 99 (Fig. II) having a connecting pin 100. Fixed to the posts 88 and 89 are ears 101—102 having bifurcated free ends straddling the rock bar pin 100, so that when the lock bar is moved laterally the pin will engage the bifurcated ears to rock the posts. This initial rocking movement of the posts throws the release springs 93 out of the path of the ratchet heads of the wheel controlling lever arms, so that the levers are free to return automatically to initial position under influence of their weighted ends, the return movement of the lock bar returning the posts, so that their spring arms may again control the operation of the wheel levers.

The end of the springs 93 engage the flanges 78—83 when thrown out of their ratchet engagement in order to limit their free projection and insure their proper return to ratchet engagement when the parts are turned back to functional position.

The lock bar has an upstanding arm 104 at one end which serves as a stop for the locking mechanism, hereinafter described, and also weights the lock bar to return it automatically to initial position, when released from its operating member, as presently described.

The operating member for the lock bar comprises the lever 26 which is operatively connected with the nickel arm 18 on the front of the register, and which is adapted for engagement with a roller 105 on the side face of the lock bar. With this arrangement when the nickel arm is actuated to operate the register, the lever 26 moves out of contact with the roller, but when it is returned it strikes the roller and moves the lock bar laterally to lift the bar and move the pivotally mounted posts 88—89 to release the other lever, the nickel lever having no stop corresponding will interfere with its manual return movement.

If it is desired to actuate the lock bar when the nickel lever has been inactive it is only necessary to move the nickel arm backwardly in order to induce the operative contact of its lever with the rock bar roller, and thereby actuate the rock bar.

I term the member 95 a lock bar for the reason that it comprises a bolt member 109 that is extended vertically through a slot 110 in the shelf 5 and is adapted for the taking into a notch 111' in the upper edge of a partition 111 in a cash drawer 112 that is slidably mounted in a compartment 113 immediately beneath the said drawer, having laterally directed lips 114 that travel in guides 115, on the sides of the lower section of the housing, the said drawer being yieldingly urged forwardly to open position by a spring 116 that is fixed within the housing and bears against the back of the drawer and being divided into compartments for large and small coins by the partitions 111'.

The ear 109 is preferably provided with a lip 109' that engages the edge of slot 110 and serves to limit movement of the bar and movement of the arm 26 to a position from which the cents wheel might be operated upon return of the lock bar to natural position.

Located beneath the cash drawer is a bell 117 having a vertical clapper post 118 and pivotally mounted on a hanger 119 is a lever 120, one end of which is adapted for striking the clapper post to ring the bell and the end of which is adapted for engagement by a tooth 121 that is pivotally mounted between the ears 122 at the rear of the cash drawer, and is adapted to turn freely in a rearward direction, but to be held by engagement with the end of the drawer to limit the forward movement. In this way, when the drawer is closed the lever 120 is held opposite the clapper post by the tooth 121. When the drawer is opened the tooth trips off the lever, so that the latter may engage the post and ring the bell.

Pivotally connected with the end of the lever 120 is a link 123, the lower end of which is pivotally mounted on a cross-bar 124; the bar 124 having forwardly directed end arms 126 anchored to the sides of the casing in such a manner that the rear cross bar 124 is yieldingly urged upwardly when unrestrained by means of a leaf spring 126' secured to the shelf 5 and having its free end underlying the bar 124.

Located at the front of the housing and fixed rigidly thereto are change tubes 127, which are perforated to disclose contents of the tubes, each having a supply trough 128 whereby contents of the tube may be fed thereto, and slidably mounted beneath the tubes are extractor plates 129 each having an aperture 130 that is located directly beneath its tube when the parts are in normal position, and through which a coin may pass to support on an underhung shelf 131; the extractor plate being slidable on the bottom of the housing. Fixed to the lock plate 129 by a lug 132 that extends through a slot 132' in the bottom of the housing is a bar 133 having a finger piece 133' at the front whereby the base and exterior part may be drawn forwardly when change is to be extracted. The sides of the plate 129 are provided with flanges 134 that move along the sides of the tube to guide the plate during its longitudinal movement and the plate is upturned at its forward end to form an indicator lip 135. The rear end of the exterior plates comprises a shank 137 which is adapted for travel in a slot 138 in the under edge of the rear cross bar 124, and has a hook 139 adapted for engaging said bar when the latter is down, to prevent forward movement of the extractor.

Fixed to the flanges 134 and to pins 140 on the bottom 131 of the change tube chamber, are springs 143, which normally retain the extractors in their closed position, but may yield to permit the extractors to be drawn out to deliver coins therefrom, it being apparent that when the extractors are closed the coin will seat in the aperture 130 thereof and be supported on the plate 131, so that when the extractors are moved forwardly the single coin is carried to delivery position and dropped without disturbing the other contents of the tube, and that as soon as the extractor is released the springs will draw it backwardly to normal position.

It is also apparent that because of the hook 139 on the rear of the extractor, the latter cannot be operated until the frame 124 is lifted, and that under normal conditions it is held down to locked position by the link 123 on the bell lever.

The change tubes are arranged at opposite sides of a box 106 that is slidably mounted in the frame of the machine and is adapted for containing surplus coins after the latter have been filled, the box being closed when the drawer 112 is closed by a lip 107 that depends from the lower edge of the box.

The register may be locked to prevent the opening of the cash drawer and manipulation of the change tube, and for this purpose I provide a locking mechanism which not only serves the function mentioned, but also is adapted for exposing a part of the register wheels that bear the indications, so that when properly manipulated the indications may be uncovered, and their readings may be discerned through the window 63, the lock being of duplicate construction so that one person may effect a reading of the register wheels while another person may control the locking of the register without being able to expose the wheels for reading.

In using the register, assuming that the parts are constructed and assembled as described, and supposing that the clerk wishes to register a sale of $2.93, and that the purchaser makes payment with a $5.00 bill, the clerk would first turn the dollar indicator arm to the two mark, this movement of the dollar pointer rotating the sleeve collar 50 on the arbor 9, which in turn rotates the lever 53 and turns the wheel 45 two points because of the connection of the lever with the wheel through the spring arm.

As the dollar lever is rotated, as described, its peripheral ratchet head moves over the spring arm 93 to obtain its position and is held by the spring arm 93 and by the arm 73' to prevent the wheel from being shot forward beyond the desired point and also to prevent retrograde movement of the wheel. The spring arm 93 on the pivotal standard 89 wipes the ratchet teeth on the lever head during the setting movement and then holds the lever against rearward movement, after setting has been accomplished, to prevent confusion of the register, should the clerk release the indicator arm before the proper amount has been set.

After setting the dollar lever to the two-point the clerk must then move the nickel arm around to the ninety point, almost a complete revolution of the arm to carry the cents wheel to position for registering ninety, and then operate the handle 39 to move the cents wheel three other points, the first movement of the cent wheel being accomplished because of the fixed connection of the ratchet 31 on the shaft 8 upon which the nickel arm is mounted, the initial movement of the cents wheel being accomplished by the rotation of sleeve 9 by the nickel arm and the rotation of the nickel lever because of its fixed mounting on the sleeve, the cents wheel being turned in the same manner as the dollar wheel, as previously described. The nickel lever has no ratchet head for anchoring the same in position but the said position is maintained because of the engagement of the tension roller within the socket of the disk 11 that is mounted on shaft 8. To enter the final three cents, the clerk must then actuate the handle 39 to the three point on the indicator 42, this movement carrying the cents wheel about another three points to complete the registration of the $2.93. After the parts have been operated as described, the cent and dollar wheels are held in such position that because of the engagement of the springs on the pivotally mounted vertical posts 88—89, with the ratchet heads on the said levers. Such locking is maintained until the posts are revolved to free the ratchet heads. This release of the levers is accomplished by moving the arms 26 on the nickel handle counterclockwise and against the roller 105, this movement moves the lock bar 36 laterally so that the same swings in an arc on its link mounting. The first movement of the bar carries the gear 109 outwardly by its spring, and the final movement of the lock bar turning the vertical post because of their connection with the lock bar to release the indicator levers.

When the posts turn, the springs leave their contact with the ratchet heads on the cents and dollars levers and as soon as the ratchet heads are free the weights on the opposite ends of the levers return the levers to initial position. When the clerk has placed the money in the cash drawer he pushes the drawer closed and the rail on the drawer slides along the lower edge of the lock bar lip until the groove in the rail is below the lip, when the latter drops into the groove and the lock bar may resume its initial position. The clerk then draws the change from the change tube by moving the slides inwardly and outwardly to remove the proper pieces from the tubes singly, change being also made from the cash drawer when the latter is opened if necessary or desirable.

The change tubes are so covered by the cash drawer and the casing that access cannot be had thereto to remove the coins from the top of the tube and the frame 124 locks the tube slides, so that they cannot be manipulated except when the cash drawer is opened, as the tooth 121 on the cash drawer holds the lever 119 back and the link 123 downwardly when the drawer is closed. When the drawer is opened, however, the link is permitted to rise under the tension of the spring frame and the frame is moved away from the lip 138 on the slide shanks, so that the slides may move against the tension of their springs, the springs returning the slides to normal position and the slides being relocked by return of the lock frame under the pressure of the link that is accomplished by engagement of the lip 121 with the end of the lever 119.

The operation of the register continues as described and when such wheel has registered its limit, it carries over to the next higher wheel. Particularly referring to the carry-over from the cents wheel when the wheel has completed a revolution, the stop-off cam 67 engages the arm 65 and locks the same on its pivotal mounting, so that its outer end is raised against the tension of the spring 58, this movement carrying the spring arm 70 upwardly and when the stop-off leaves the engagement with the arm, the latter is moved back under tension of its spring and engagement with the teeth of the dollar wheel moves the dollar wheel one space.

This operation is repeated on each complete revolution of the cents wheel.

The carry-over from the dollar to the hundred dollar wheel is accomplished in the same manner, it being apparent that as many wheels as may be desired may be provided for showing larger figures, although the registering may be accomplished by the three levers heretofore mentioned.

Having thus described my invention, what I claim therein and desire to secure by Letters-Patent, is:—

1. In a register, the combination with a rotatable sleeve, of a disk fixed on the sleeve and having equally spaced peripheral pockets, a register wheel rotatable on the sleeve and having graduation pockets equally spaced and of greater number than the disk pockets, an indicator arm fixed on the sleeve, an actuating arm fixed on the sleeve, and means on the actuating arm for operating the register wheel to advance the same for one or more of said pockets, and means for yieldingly seating in the disk pockets, for the purpose set forth.

2. In a register, the combination with an indicator wheel having a plurality of equally spaced pockets, of an anchoring member operable independently of the wheel and having equally spaced stop portions of less number than the pockets on the wheel, an operating arm in fixed relation to the anchoring member, an actuating arm in fixed relation to the anchoring arm, means on the actuating arm for engaging the pockets on the wheel to advance the same, means for engaging the stop portions on the anchoring member to determine the advance of the wheel, and independent means for operatively engaging the wheel to advance the same a distance less than permitted by the anchoring member.

3. In a register, the combination with a register wheel, of an arm mounted coaxially with the wheel and having a slot therein, means on the arm for operatively engaging the wheel, a crank member having a bar slidably projected through the slot, and a handle on the crank member, for the purpose set forth.

4. In a register, the combination with a rotatable axis, of a register wheel revoluble on the axis, an anchoring member fixed on the axis and having equally spaced stop portions, an indicator arm fixed on the axis, an actuating arm fixed on the axis, means on the actuating arm for operatively engaging the wheel, means for engaging the stop portions on the anchoring member to limit advance of the wheel to determined distances, a bracket revolubly mounted coaxially with the wheel and anchoring member, means on the bracket for advancing the wheel, and a crank member for actuating the bracket.

5. In a register, the combination with a rotatable axis, of a register wheel revoluble on the axis, an anchoring member fixed on the axis and having equally spaced stop portions, an indicator arm fixed on the axis, an actuating arm fixed on the axis, means on the actuating arm for operatively engaging the wheel, means for engaging the stop portions on the anchoring member to limit advance of the wheel to determined distances, a bracket revolubly mounted coaxially with the wheel and anchoring member, means on the bracket for advancing the wheel, a crank member for actuating the bracket, a dial adapted for coöperation with the indicator arm to disclose advance of the register wheel, and a dial on the crank member for disclosing advance of the wheel, substantially as set forth.

In testimony whereof I affix my signature.

BERNHARD A. NEUMANN.

Copies of this patent may be obtained for five cents each, by addressing the "Commissioner of Patents, Washington, D. C."